United States Patent
Sheller

(10) Patent No.: US 10,484,647 B1
(45) Date of Patent: *Nov. 19, 2019

(54) BANDWIDTH ESTIMATION OF A NETWORK CONNECTION

(71) Applicant: WhatsApp Inc., Mountain View, CA (US)

(72) Inventor: Jonathan David Sheller, San Francisco, CA (US)

(73) Assignee: WhatsApp Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,541

(22) Filed: Feb. 4, 2019

Related U.S. Application Data

(63) Continuation of application No. 15/792,314, filed on Oct. 24, 2017, now Pat. No. 10,244,205.

(51) Int. Cl.
| | |
|---|---|
| H04N 7/14 | (2006.01) |
| H04W 28/02 | (2009.01) |
| H04N 7/15 | (2006.01) |
| H04W 28/06 | (2009.01) |

(52) U.S. Cl.
CPC ............ *H04N 7/147* (2013.01); *H04N 7/15* (2013.01); *H04W 28/0289* (2013.01); *H04W 28/06* (2013.01)

(58) Field of Classification Search
CPC combination set(s) only.
See application file for complete search history.

(56) References Cited

U.S. PATENT DOCUMENTS

| | | | |
|---|---|---|---|
| 8,130,788 B2 | 3/2012 | Tsao | |
| 8,356,327 B2 | 1/2013 | Van Beek | |
| 8,498,271 B2 * | 7/2013 | Lee | H04L 47/10 370/332 |
| 2009/0196343 A1 * | 8/2009 | Cho | H04L 1/0009 375/240.02 |
| 2011/0026401 A1 | 2/2011 | Wakuda et al. | |
| 2012/0099416 A1 | 4/2012 | Bekiares et al. | |
| 2014/0222964 A1 * | 8/2014 | Leong | H03M 13/23 709/219 |
| 2015/0250001 A1 | 9/2015 | Tan et al. | |
| 2015/0304734 A1 | 10/2015 | De Vleeschauwer et al. | |

* cited by examiner

*Primary Examiner* — Phung-Hoang J Nguyen
(74) *Attorney, Agent, or Firm* — Fenwick & West LLP

(57) ABSTRACT

Aspects of the present disclosure describe an end-to-end communication protocol for interactive applications that ensure high throughput and low delay. A sender device and a receiver device are in communication with each other through a network. As multimedia content is captured by the sender device, the sender device packetizes each frame of the multimedia content into a plurality of packets thereby creating a packet train of packets that are sent to the receiver the device. The receiver device models the behavior of the network based on a continuous distribution. Based on the model of the network, the receiver device generates a forecast that describes the amount of data that the sender device can send to the receiver device. The receiver device sends the forecast to the sender device which subsequently sends data to the receiver device according to the forecast.

18 Claims, 3 Drawing Sheets

BANDWIDTH ESTIMATION OF A NETWORK CONNECTION

CROSS-REFERENCE TO RELATED APPLICATIONS

This application is a continuation of U.S. patent application Ser. No. 15/792,314 filed on Oct. 24, 2017 which is incorporated by reference in its entirety.

BACKGROUND OF THE INVENTION

Widespread use of mobile devices has made them an indispensable tool to businesses and individuals alike. Many individuals carry their mobile devices almost everywhere they go just in case they need to make a call. As a result, friends and colleagues have come to reasonably expect they can get a hold of each other almost immediately with a single phone call.

Mobile devices with multimedia data capabilities have created an explosion in the creation and playback of sound, images and video. High-resolution cameras and sound recorders on these mobile devices have enabled people to capture high quality images and videos of personal events, news events and other events as they occur. Due to the high-resolution cameras and sound recorders on these mobile devices, interactive applications on the mobile devices allow for video conferencing between users of mobile devices.

Interactive applications such as video conferencing application require high throughput and low delay to provide an enjoyable experience. However, cellular networks have link speeds that can change dramatically over time. Current communication protocols cannot adapt to the changing link speeds and typically build up multi-second queues in the cellular network thereby resulting in poor video conferencing quality.

SUMMARY

Aspects of the present disclosure describe an end-to-end communication protocol for interactive applications that ensure high throughput and low delay. In one embodiment, a sender device and a receiving device are in communication with each other through a network. The sender device and the receiving device may be transmitting multimedia content to each other such as video for a video conference. As multimedia content is captured by the sender device, the sender device packetizes each frame of the multimedia content into a plurality of packets thereby creating a packet train of packets. The sender device sends the packet train of packets to the receiving device to periodically saturate the network connection between the sender device and the receiving device.

The receiving device receives the packet train and can model the network behavior of the network at any time based on the packet train of packets received from the sender device. In one embodiment, the receiving device models the network behavior of the network based on a continuous distribution. Based on the model of the network, the receiving device generates a packet delivery forecast. The packet delivery forecast is a prediction of the amount of data that the sender device can send without risking that the packets will be stored at the sender device or in the network for a period of time greater than the threshold amount of time.

The receiving device transmits the packet delivery forecast to the sender device. The sender device may then calculate a window size that describes the amount of data that the sender device can send to the receiving device over the network while ensuring the that each packet stored at the sender device is not queued for transmittal at the sender device or the network for longer than a threshold amount of time. By sending packets of data according to the window size, the likelihood of buffering during the video conference is minimized thereby increasing the video quality of the video conference.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
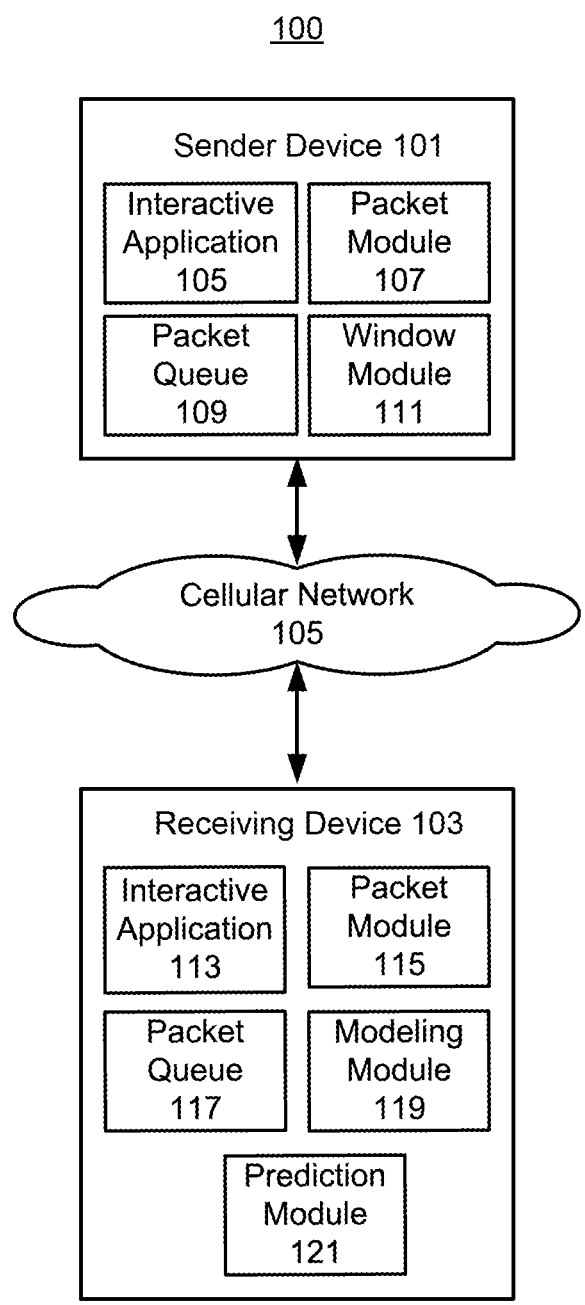
FIG. 1 is a diagram illustrating an end-to-end communication environment according to one embodiment of the present disclosure.

FIG. 1 is a diagram illustrating an end-to-end communication environment 100 in accordance with one embodiment. In one embodiment, the end-to-end communication environment 100 includes a sender device 101 and a receiving device 103 that are in communication with each other via a cellular network 105. A wireless phone provider may provide the cellular network 105 in order to connect the sender device 101 and the receiving device 103 together and/or to the Internet.

In the context of the disclosure, users of the sender device 101 and the receiving device 103 may participate in a video conference where audio and visual data is transmitted between the sender device 101 and the receiving device 103. The embodiments herein generally describe an end-to-end transport protocol for an interactive application such as a video conferencing application that allows for high throughput and low delay. Thus, the transport protocol allows users of the sender device 101 and the receiving device 103 to conduct a video conference with the highest possible image and sound resolution while experiencing minimal delay of data.

The sender device 101 and the receiving device 103 are generally multimedia devices. Examples of a multimedia device include wireless smart phones, tablet computers, laptops, etc. The sender device 101 and the receiving device 103 also have the ability to access a data network using a data protocol such as TCP/IP. The sender device 101 and the receiving device 103 also have general purpose computing capabilities.

The wireless phone provider of cellular network 105 may implement any one or more different wireless protocols. Typically, most wireless providers use Global System for Mobile (GSM), Code Division Multiple Access (CDMA) or some variant compatible with one or more features of these technologies. Each of these and other wireless protocols support a data channel that transmits data (e.g., audio, video, audio and video, text, images, etc.) between the sender device 101 and the receiving device 103.

In one embodiment, the sender device 103 includes an interactive application 105. The interactive application 105 is an application that allows the user of the sender device 101 to interact with users of other devices such as the user of the receiving device 103. One example of the interactive application 105 is a video conferencing application that allows the users of devices 101, 103 to communicate with each other via video conference. The interactive application 105 can be any other type of application that allows users of the sender device 101 and the receiving device 103 to interact with one another. However, in the context of the embodiments described herein the interaction application 105 represents a video conferencing application.

In one embodiment, a video conference is a live, visual connection between multiple people for the purpose of communication. A video conference at its simplest may merely include a transmission of static images and text between the sender device 103 and the receiving device 105. At its most sophisticated, a video conference provides transmission of full-motion video images and audio between the sender device 101 and the receiving device 103. The interactive application 105 is configured to capture any combination of video, audio, and/or text that represents the content for the video conference via a camera, microphone, keyboard or any other input device included in the sender device 101 and the receiving device 103.

The sender device 101 also includes a packet module 107. In one embodiment, the packet module 107 generates packet trains based on the content captured by the interactive application 105. Generally, a video is composed of a series of video frames where each video frame is a still image. For each video frame of content captured by the interactive application 105, the packet module 107 packetizes the video frame into a plurality of packets. In one embodiment, the packet module 107 creates at least two packets for a single video frame. For example, if a single video frame comprises 1000 bytes, the packet module 107 may divide the video frame into two packets of 500 bytes each. Thus, the packet module 107 may divide a given video frame into equally sized packets.

Accordingly, as the interactive application 105 is capturing content for the video conference, the packet module 107 is generating packets from the captured content. By creating packets of the captured content, the sender device 101 will have packets available to always send to the receiving device 103 via the cellular network 105. Having packets available to send to the receiving device 103 is necessary because data traffic on the cellular network is typically bursty when sending data for a video conference. That is, the amount of data sent on the cellular network 105 is not consistent throughout the video conference. There may be periods of time where a high rate of data is used to transmit packets on the cellular network 105 during the video conference and periods of time where a lower rate of data is used to transmit packets on the cellular network 105 during the video conference. By always having packets available to send to the receiving device 103 via the cellular network 105, the receiving device 103 will not incorrectly believe that there is a network outage on the cellular network 105 if one or more packets are not received by the receiving device 103.

In one embodiment, the sender device 101 further includes a packet queue 109. The packet queue 109 stores a list of the packets generated by the packet module 107. The packets in the packet queue 109 represent the packets awaiting transmission to the receiving device 105. In one embodiment, each packet sent to the receiving device 103 is transmitted with a sequence number that describes the total number of bytes that the sender device 101 has sent to the receiving device 103 during the video conference and a sequence number that describes the sequence number offset of the most recent packet that was sent to the receiving device 103 more than a threshold amount of time prior (e.g., 10 ms). While the cellular network 105 may reorder the packets during transmission, the cellular network 105 will not reorder two packets that were sent more than 10 ms apart. Accordingly, once the receiving device 103 receives a packet from the sender device 101, the receiving device 103 can mark all bytes up to the sequence number of the first packet sent within the 10 ms as either received or lost, and track only the more recent packets.

The sender device 101 further includes a window module 111. The window module 111 calculates a window size that describes the amount of data that the sender device 101 can send to the receiving device 103 via the cellular network 105 while ensuring that every packet has a threshold probability (e.g., 95%) of clearing the packet queue 109 within a threshold amount of time (e.g., 100 ms). The window size calculated by the window module 111 ensures that no packet is within the queue for longer than the threshold amount of time thereby increasing the quality of the video conference.

In one embodiment, the window module 111 calculates the window size based on a packet delivery forecast received from the receiving device 103. The packet delivery forecast is a prediction of the amount of data that the sender device 101 can send without risking that the packets will be stored in the packet queue 109 or the cellular network 105 for a period of time greater than the threshold amount of time. Generally, the packet delivery forecast is a cautious estimate in the $5^{th}$ percentile of how many bytes will arrive at the receiving device 105 during a threshold number of ticks (e.g., 8 ticks) where each tick is 20 ms but other tick sizes can be used. The packet delivery forecast is not guaranteed to be completely accurate, but for most interactive applications the risk of a packet being in the packet queue 109 for longer than the threshold amount of time is less than 5%. In one embodiment, the packet delivery forecast also includes a total number of bytes that the receiving device 103 has received from the sender device 101 as well as a total number of byes that the receiving device 103 has determined has been lost during transmission via the cellular network 105.

Upon receipt of the packet delivery forecast, the window module 111 creates a timestamp describing when the packet delivery forecast was received. The window module 111 then estimates the number of packets currently in the packet queue 109 based on the difference between the number of bytes the sender device 101 has transmitted to the receiving device 103 and sequence number in the forecast describing the packets that have been received or lost. The window module 111 maintains the estimate of the number of packets in the packet queue 109 and for every packet sent, the window module 111 increments the estimate. Each time the next tick of the packet forecast is advanced, the window module 111 decrements the estimate of the number of packets in the packet queue by the amount of the forecast thereby bounding the estimate below at zero packets.

In one embodiment, the window module 111 calculates the window size by determining an estimated number of packets expected to be removed from the packet queue 109 over a future period of time (e.g., five ticks). The window module 111 then calculates the difference between the total number of packets in the packet queue 109 with the estimated number of packets to be removed from the packet queue 109 over the future period of time. The remaining number of packets represents the window size of packets that the sender device 101 can safely send to the receiving device 103 within a threshold amount of time from entering the packet queue 109 (e.g., 100 ms).

In one embodiment, the receiving device 103 includes an interactive application 113. The interaction application 113 is similar to the interactive application 105 at the sender device 101. The interactive application 113 allows the user of the receiving device 103 to interact with users of other devices such as the user of the sender device 101. In the context of the embodiments described herein, the interaction application 113 represents a video conferencing application as described above.

The receiving device 103 also includes a packet module 115 similar to the packet module 107 included in the sender device 101. In one embodiment, the packet module 115 generates packet trains based on the content captured by the interactive application 113 as described above with respect to the packet module 107 included in the sender device 101.

In one embodiment, the receiving device 103 further includes a packet queue 117 similar to the packet queue 109 included in the sender device 101. The packet queue 117 stores a list of the packets generated by the packet module 115. The packets in the packet queue 117 represent the packets awaiting transmission to the sender device 101. The packet queue 117 performs similar functionality as the packet queue 109 described above with respect to the sender device 101.

The receiving device 103 also includes a modeling module 119 that models the behavior of the cellular network 105. The modeling module 119 may model the behavior of the cellular network 105 at any time so that predictions can be made about how much data can be transmitted within the cellular network 105 such that data can be transmitted without being stored in the packet queues 107, 117 or the cellular network 105 for a period of time greater than a threshold amount of time.

In one embodiment, the modeling module 119 assumes that the distribution of the majority of packet arrivals at the receiving device 103 closely fits a Poisson distribution. Generally, a Poisson process has an underlying rate λ. In one embodiment, the modeling module 115 assigns a continuous probability distribution to the rate λ and allows the rate λ to assume any value. In one embodiment, the probability distribution assigned to the rate λ is a conjugate prior.

The modeling module 119 may model the cellular network 105 according to the following equation:

$$P(D \mid \lambda) = \frac{(\lambda \tau)^k e^{-\lambda \tau}}{k!}$$

In the above equation, P(D|λ) represents the probability of observing event D given that the underlying rate λ is true, τ is the time since the last observation of P(D|λ), and k is the count parameter. Event D is the observed data and more particularly the inter-arrival time between packets in the packet train in one embodiment. K may be associated with different counts based on different operating modes. For example, k can be a constant 1, a count of bytes 2, a count of packets 3, or a count of MTUs (maximum transmission units).

In one embodiment, the conjugate prior is a gamma distribution which has a probability density function PDF of:

$$\frac{\beta^\alpha}{\Gamma(\alpha)} x^{\alpha-1} e^{-\beta x}$$

In the above equation, x is a random variable that is gamma-distributed with shape α and rate β. Γ(α) is a complete gamma function.

The PDF can be simplified if all terms that do not depend on the rate parameter X are ignored resulting in the following equation:

$$P(\lambda \mid D) \propto P(D \mid \lambda) P(\lambda) = \frac{(\lambda \tau)^k e^{-\lambda \tau}}{k!} \frac{\beta^\alpha}{\Gamma(\alpha)} x^{\alpha-1} e^{-\beta x}$$
$$= \lambda^k e^{-\lambda \tau} \lambda^{\alpha-1} e^{-\beta \lambda}$$
$$= \lambda^{\alpha+k-1} e^{-(\beta+\tau)\lambda}$$

After the PDF is normalized, another gamma distribution is created with the parameters α'=α+k and β'=β+τ.

In one embodiment, since the rate parameter X is continuous, the gamma distribution assigns zero probability to a zero rate (e.g., an outage of the cellular network 105) thereby resulting in a separate probability for an outage. A benefit of having a separate probability for an outage is there is no artifact from where in the tick an outage began. In one embodiment, the modeling module 119 ignores any gaps in packets that are received that are shorter than a grace period. The "Outage Probability Equations" section below describes equations for calculating the outage probability of the cellular network 105.

The receiving device 103 may also include a prediction module 121. The prediction module 121 predicts how much data that the sender device 101 can transmit to the receiving device 103 without risking that packets will be stored in the packet queue 109 for greater than a threshold amount of time. The prediction module 121 generates a packet delivery forecast for the sender device 101 as described above with respect to the sender device 101. Generally, the packet delivery forecast is a cautious estimate (e.g., in the 5$^{th}$ percentile) of how many bytes will arrive at the receiving device 105 during a threshold number of ticks (e.g., 8 ticks) where each tick is 20 ms in one embodiment. The packet delivery forecast is not guaranteed to be completely accurate, but for most interactive applications the risk of a packet being in the packet queue 109 for longer than the threshold amount of time is less than 5%.

In one embodiment, the prediction module 121 generates the packet delivery forecast by evolving the probability distribution forward. The packet delivery forecast may be generated once per tick where a tick is 20 ms in one embodiment. At each tick, the prediction module 121 updates the probability distribution for the underlying rate λ and the outage probability based on the most recently received data. For each tick, the prediction module 121 evolves the outage probability and the rate distribution and then calculates the 5th percentile of the distribution for count of (byteslpacketsIMTUs) received based on the rate distribution and the 5$^{th}$ percentile distribution. The prediction module 121 marginalizes the joint distribution of count and rate over rate in order to calculate percentiles for count. In one embodiment, the prediction module 121 sends the packet delivery forecast to the sender device 101 by including the forecast in outgoing packets to the sender device 101.

Figure 2:
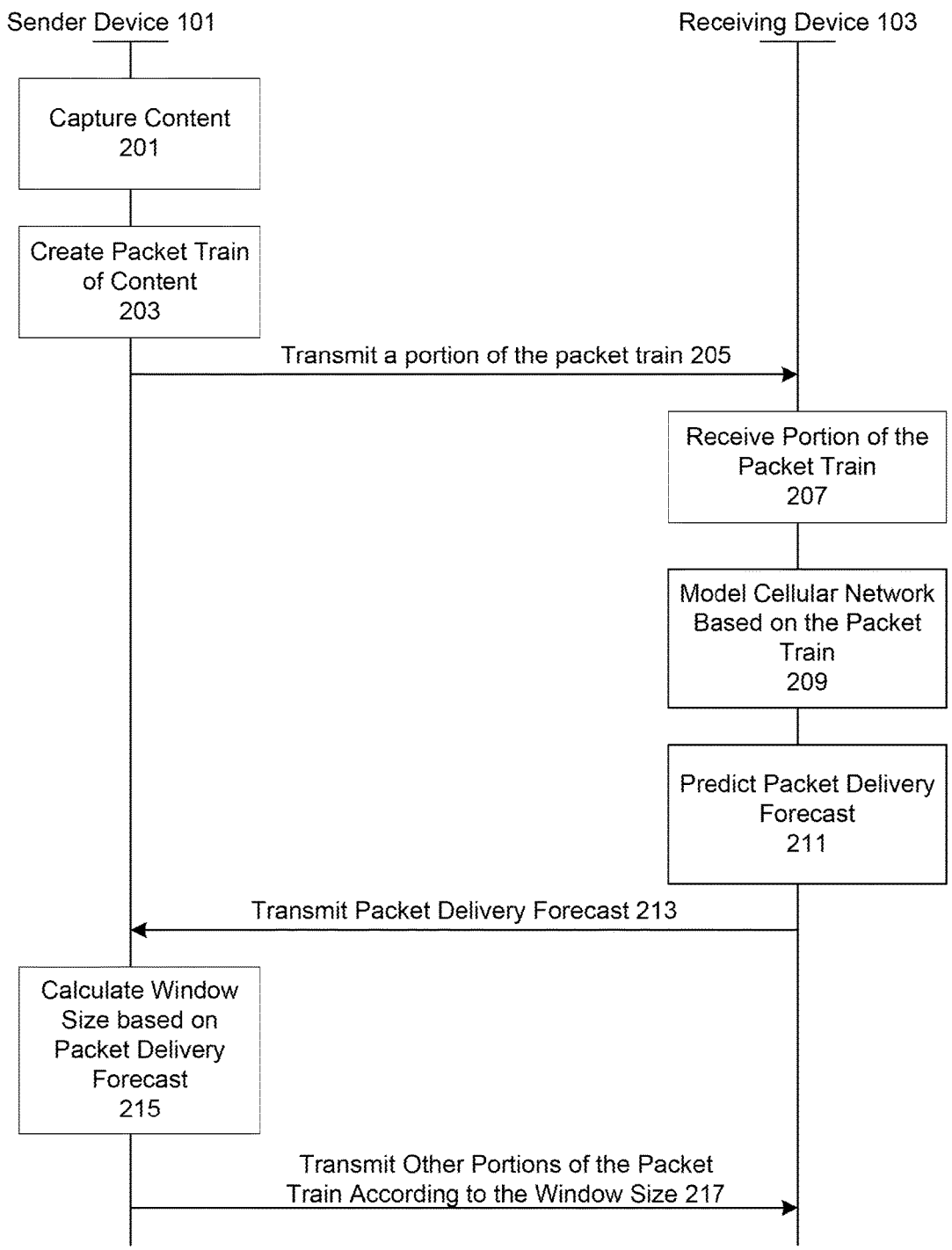
FIG. 2 is an interaction diagram describing an end-to-end transport protocol according to one embodiment of the present disclosure.

FIG. 2 is an interaction diagram describing the process of communicating packets of a video conference between the sender device 101 and the receiving device 103 in the environment of FIG. 1. Note that in other embodiments other steps may be performed.

In one embodiment, the sender device 101 captures 201 content for transmittal between the sender device 101 and the receiving device 103. For example, the captured content may be video data for a video conference between the sender device 101 and the receiving device 103. The sender device 101 creates 203 a packet train of content based on the captured content. As mentioned above, a video is composed of a series of video frames where each video frame is a still image. For each video frame in the content captured by the sender device 101, the sender device 101 packetizes the video frame into a plurality of packets. This allows the sender device 101 to periodically saturate the cellular connection 105 with data.

The sender device 101 transmits 205 a portion of the packet train 205 to the receiving device 103. The receiving device 102 receives 207 the portion of the packet train transmitted by the sender device 101. The receiving device 102 models 209 the cellular network 105 based on the portion of the packet train received from the sender device 101 and predicts 211 the packet delivery forecast. The receiving device 103 transmits 213 the packet delivery forecast to the sender device.

The sender device 102 calculates 215 a window size based on the packet delivery forecast received from the receiving device 215. The window size describes the amount of data that the sender device 101 can send to the receiving device 103 via the cellular network 105 while ensuring that every packet has a threshold probability (e.g., 95%) of clearing the packet queue 109 within a threshold amount of time (e.g., 100 ms). The sender device 101 can then transmit 217 other portions of the packet train according to the calculated window size.

Figure 3:
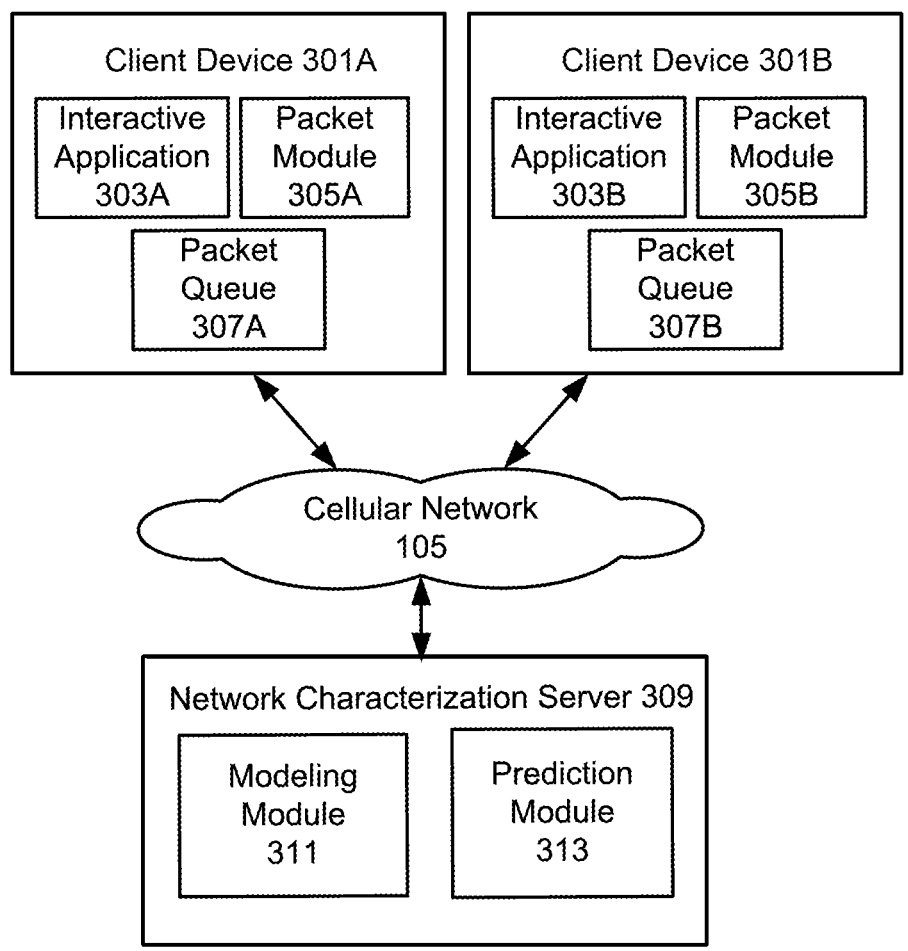
FIG. 3 is a diagram illustrating a system environment for facilitating multi-party video conferences according to one embodiment of the present disclosure.

FIG. 3 is a diagram illustrating a system environment 300 for facilitating multi-party video conferences according to one embodiment of the present disclosure. As shown in FIG. 3, the system environment 300 includes client device 301A and client device 301B. Client devices 301A, 301B include interactive applications 303A, 303B, packet modules 305A, 305B, and packet queues 307A, 307B. The interactive applications 303A, 303B, packet modules 305A, 305B, and packet queues 307A, 307B respectively perform similar functionality as the interactive applications 105, 113, packet modules 107, 115, and packet queues 109, 117 described above with respect to FIG. 1.

The system environment 300 also includes a network characterization server 309. In the embodiment described with respect to FIG. 1, the receiving device 103 characterized the bandwidth of the cellular network 105. In contrast, in the embodiment shown in FIG. 3 the network characterization server 309 characterizes the bandwidth of the cellular network 105.

Generally, the network characterization server 309 observes a video conference between client devices 301A and 301B using the cellular network 105. Since multiple client devices 301A and 301B are connected to the network characterization server 309, one or more the client devices 301A and 301B may have a poor connection to the cellular network 105 thereby resulting in a low quality video conference. In one embodiment, a low quality video conference may result in packets being stored in either packet queue 307 of the client devices 301 for a time period greater than a threshold amount of time due to a poor connection to the cellular network 105. This results in unwanted buffering during the video conference. If the network characterization server 309 determines that the quality of the video conference is below a threshold value, the network characterization server 309 may instruct at least one of client device 301A or client device 301B to reduce the rate in which the client device is transmitting packets across the cellular network.

As shown in FIG. 3, the network characterization server 309 includes a modeling module 311. The modeling module 311 models the behavior of the cellular network 105 at any time so that predictions can be made about how much data can be transmitted within the cellular network 105 such that data can be transmitted without being stored in the packet queues 307A, 307B for a period of time greater than a threshold amount of time. The modeling module 311 performs similar functionality as the modeling module 119 described with respect to FIG. 1.

The network characterization server 309 also includes a prediction module 313. The prediction module 313 predicts how much data can be transmitted on the cellular network 105 between the client devices 301 without risking that packets will be stored in the packet queues 307 for greater than a threshold amount of time. The prediction module 313 may generate a packet delivery forecast as described above.

However, in contrast to the embodiment of FIG. 1, the prediction module 313 may not transmit the packet delivery forecast to the client devices 301A and 301B. Rather, in one embodiment, the prediction module 313 may instruct at least one of client device 301A or client device 301B to reduce the rate in which the client device is transmitting packets across the cellular network 105 according to the packet delivery forecast.

In an alternative embodiment, the prediction module 313 may transmit the packet deliver forecast to the client devices 301A and 301B similar to the embodiment of FIG. 1. At least one of the client devices 301A and 301B may instruct the network characterization server 309 to reduce the rate in which the network characterization server 309 transmits packets through the cellular network 105 based on the packet delivery forecast to ensure a high quality video conference.

Outage Probability Equations

Let $\alpha$ be the outage entry rate and let f be the outage exit rate.

Treating outages as the product of a continuous-time Markov chain, a transition matrix is set to:

$$Q = \begin{bmatrix} -\alpha & \alpha \\ \beta & -\beta \end{bmatrix}$$

This means that for a time delta of r, the outage probability transition matrix is given by:

$expm(\tau * Q)$

To calculate the transition matrix, a function expm is implemented. The matrix is diagonalized and the following identity is used: If $\tau*Q=P*D*P^{-1}$ where D is a diagonal matrix, then $expm(\tau*Q)=P*expm(D)*P^{-1}$ and $$expm(D) = \begin{bmatrix} e^{\lambda_1} & 0 \\ 0 & e^{\lambda_2} \end{bmatrix}$$

Therefore a simple expression for the diagonalization of $\tau*Q$ is required. The eigenvectors of $\tau*Q$ are determined. First, the eigenvalues are determined.

$$\det(\tau*Q - \lambda I) = 0$$

$$\det\left(\begin{bmatrix} -\tau\alpha - \lambda & \tau\alpha \\ \tau\beta & -\tau\beta - \lambda \end{bmatrix}\right) = 0$$

$$(-\tau\alpha - \lambda)(-\tau\beta - \lambda) - \tau^2\alpha\beta = 0$$

$$\tau^2\alpha\beta + \lambda\tau\beta + \lambda\tau\alpha + \lambda^2 - \tau^2\alpha\beta = 0$$

$$\lambda^2 + \lambda\tau(\alpha + \beta) = 0$$

$$\lambda(\lambda + \tau(\alpha + \beta)) = 0$$

$$\lambda = 0 \text{ or } \lambda = -\tau(\alpha + \beta)$$

The eigenvalues are used to determine the eigenvectors. For $\lambda = 0$ $$\begin{bmatrix} -\tau\alpha & \tau\alpha \\ \tau\beta & -\tau\beta \end{bmatrix} \begin{bmatrix} x \\ y \end{bmatrix} = 0$$

$$x = y$$

The vectors are normalized such that $$x = y = \frac{1}{\sqrt{2}}$$

For $\Delta = -\tau(\alpha + \beta)$ $$\begin{bmatrix} -\tau\alpha + \tau(\alpha+\beta) & \tau\alpha \\ \tau\beta & -\tau\beta + \tau(\alpha+\beta) \end{bmatrix} \begin{bmatrix} x \\ y \end{bmatrix} = 0$$

$$\begin{bmatrix} \tau\beta & \tau\alpha \\ \tau\beta & \tau\alpha \end{bmatrix} \begin{bmatrix} x \\ y \end{bmatrix} = 0$$

$$\tau\beta x + \tau\alpha y = 0$$

$$x^2 + y^2 = 1$$

$$\tau\beta x = -\tau\alpha y$$

$$x = \frac{-\tau\alpha y}{\tau\beta}$$

$$\left(\frac{-\tau\alpha y}{\tau\beta}\right)^2 + y^2 = 1$$

$$\left(\left(\frac{-\tau\alpha}{\tau\beta}\right)^2 + 1\right) y^2 = 1$$

$$y = \frac{1}{\sqrt{\left(\frac{-\tau\alpha}{\tau\beta}\right)^2 + 1}} = \frac{\beta}{\sqrt{\alpha^2 + \beta^2}}$$

$$x = -\frac{\alpha}{\sqrt{\alpha^2 + \beta^2}}$$

Therefore we have P and D:

$$P = \begin{bmatrix} -\frac{\alpha}{\sqrt{\alpha^2+\beta^2}} & \frac{1}{\sqrt{2}} \\ \frac{\beta}{\sqrt{\alpha^2+\beta^2}} & \frac{1}{\sqrt{2}} \end{bmatrix}$$

$$D = \begin{bmatrix} -\tau(\alpha+\beta) & 0 \\ 0 & 0 \end{bmatrix}$$

$P^{-1}$ is next determined.

$$P^{-1} = \frac{1}{\det(P)} \begin{bmatrix} \frac{1}{\sqrt{2}} & -\frac{1}{\sqrt{2}} \\ -\frac{\beta}{\sqrt{\alpha^2+\beta^2}} & -\frac{\alpha}{\sqrt{\alpha^2+\beta^2}} \end{bmatrix} = \begin{bmatrix} -\frac{\sqrt{\alpha^2+\beta^2}}{\alpha+\beta} & \frac{\sqrt{\alpha^2+\beta^2}}{\alpha+\beta} \\ \frac{\sqrt{2}\beta}{\alpha+\beta} & \frac{\sqrt{2}\alpha}{\alpha+\beta} \end{bmatrix}.$$

As shown above, D only depends on $\tau$, so a large percentage of these matrices can be precalculated.

If p is set to be the probability that we are currently in an outage, then the current state is:

$$S = \begin{bmatrix} 1-p \\ p \end{bmatrix}$$

To update S, it is multiplied by $(P\text{expm}(D)P^{-1})^\tau$ $$S_{n+1} = (P\text{expm}(D)P^{-1})^T S_n = (P^{-1})^T \text{expm}(D)^T P^T S_n$$

$$S_{n+1} = (P^{-1})^T \begin{bmatrix} \exp(-\tau(\alpha+\beta)) & 0 \\ 0 & 1 \end{bmatrix} P^T S_n.$$

Moving from right to left, we have $$P^T S_n = \begin{bmatrix} -\frac{\alpha}{\sqrt{\alpha^2+\beta^2}} & \frac{\alpha}{\sqrt{\alpha^2+\beta^2}} \\ \frac{1}{\sqrt{2}} & \frac{1}{\sqrt{2}} \end{bmatrix} \begin{bmatrix} 1-p \\ p \end{bmatrix}$$

$$= \begin{bmatrix} -\frac{\alpha}{\sqrt{\alpha^2+\beta^2}}(1-p) + \frac{\beta}{\sqrt{\alpha^2+\beta^2}} p \\ \frac{1}{\sqrt{2}} \end{bmatrix}$$

$$\text{expm}(D)^T P^T S_n = \begin{bmatrix} \exp(-\tau(\alpha+\beta)) & 0 \\ 0 & 1 \end{bmatrix} \begin{bmatrix} -\frac{\alpha}{\sqrt{\alpha^2+\beta^2}}(1-p) + \frac{\beta}{\sqrt{\alpha^2+\beta^2}} p \\ \frac{1}{\sqrt{2}} \end{bmatrix}$$

$$= \begin{bmatrix} \exp(-\tau(\alpha+\beta))\left(-\frac{\alpha}{\sqrt{\alpha^2+\beta^2}}(1-p) + \frac{\beta}{\sqrt{\alpha^2+\beta^2}} p\right) \\ \frac{1}{\sqrt{2}} \end{bmatrix}$$

-continued $$(P^{-1})^T \operatorname{expm}(D)^T P^T S_n = \begin{bmatrix} -\dfrac{\sqrt{\alpha^2+\beta^2}}{\alpha+\beta} & \dfrac{\sqrt{2}\beta}{\alpha+\beta} \\ \dfrac{\sqrt{\alpha^2+\beta^2}}{\alpha+\beta} & \dfrac{\sqrt{2}\alpha}{\alpha+\beta} \end{bmatrix}$$

$$\begin{bmatrix} \exp(-\tau(\alpha+\beta))\left(-\dfrac{\alpha}{\sqrt{\alpha^2+\beta^2}}(1-p)+\dfrac{\beta}{\sqrt{\alpha^2+\beta^2}}p\right) \\ \dfrac{1}{\sqrt{2}} \end{bmatrix}$$

$$= \begin{bmatrix} -\dfrac{\sqrt{\alpha^2+\beta^2}}{\alpha+\beta}\exp(-\tau(\alpha+\beta)) \\ \left(-\dfrac{\alpha}{\sqrt{\alpha^2+\beta^2}}(1-p)+\dfrac{\beta}{\sqrt{\alpha^2+\beta^2}}p\right) + \\ \dfrac{\sqrt{2}\beta}{\alpha+\beta}\dfrac{1}{\sqrt{2}} \\ \dfrac{\sqrt{\alpha^2+\beta^2}}{\alpha+\beta}\exp(-\tau(\alpha+\beta)) \\ \left(-\dfrac{\alpha}{\sqrt{\alpha^2+\beta^2}}(1-p)+\dfrac{\beta}{\sqrt{\alpha^2+\beta^2}}p\right) + \\ \dfrac{\sqrt{2}\beta}{\alpha+\beta}\dfrac{1}{\sqrt{2}} \end{bmatrix}$$

$$= \begin{bmatrix} \exp(-r(\alpha+\beta))\left(\dfrac{\alpha}{\alpha+\beta}(1-p) - \dfrac{\beta}{\alpha+\beta}p\right) + \dfrac{\beta}{\alpha+\beta} \\ \exp(-r(\alpha+\beta))\left(-\dfrac{\alpha}{\alpha+\beta}(1-p) + \dfrac{\beta}{\alpha+\beta}p\right) + \dfrac{\alpha}{\alpha+\beta} \end{bmatrix}$$

$$= \begin{bmatrix} \exp(-r(\alpha+\beta))\left(\dfrac{\alpha}{\alpha+\beta} - p\right) + \dfrac{\beta}{\alpha+\beta} \\ \exp(-r(\alpha+\beta))\left(-\dfrac{\alpha}{\alpha+\beta} - p\right) + \dfrac{\alpha}{\alpha+\beta} \end{bmatrix}$$

While examples and implementations have been described, they should not serve to limit any aspect of the present invention. Accordingly, implementations of the invention can be implemented in digital electronic circuitry, or in computer hardware, firmware, software, or in combinations of them. Implementations of the invention may further include a computer program product, comprising a machine usable medium having computer readable program code tangibly embodied therein. The computer readable program code in the computer program product performs implementations of the invention when executed by a programmable processor.

Aspects of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. In some implementations, multimedia data is described as being formatted according to one format or another format yet may also be organized according to a "container" type instead. Containers of data compatible with one container type may be converted from one container type to another container type. In some implementations, the "container" or "container file" may contain a single data type such as audio (e.g., AIFF, WAVE, XMF, or MP3), video, or multiple related data types concerning combinations thereof with audio and video (e.g., 3GP, ASE, AVI, DVR-MS, FLASH video, IFF, QuickTime File Format, MPEG program stream, MP4, and others), while in other implementations the "container file" may further include subtitles, chapter-information, and meta-data or tags for frames of data or subsets of the data along with synchronization information required to playback the streams of data together. Accordingly, the invention is not limited to the above-described implementations, but instead is defined by the appended claims in light of their full scope of equivalents.

I claim:

1. A computer-implemented method of communicating multimedia content between devices, the method comprising:
   receiving, by a first device, a first plurality of data packets from a second device via a cellular network, the first plurality of data packets representative of one or more first frames of multimedia content;
   modeling, by the first device, a data transmission rate of the cellular network based on a continuous probability distribution, wherein the data transmission rate of the cellular network is assigned a conjugate prior;
   predicting, by the first device, a forecast that is indicative of an amount of data that the second device can transmit to the first device via the cellular network based on the modeled data transmission rate;
   transmitting, by the first device, the predicted forecast to the second device via the cellular network; and
   receiving, by the first device, a second plurality of data packets from the second device via the cellular network according to the forecast, the second plurality of data packets representative of one or more second frames of multimedia content.

2. The computer-implemented method of claim 1, wherein the multimedia content is video from a video conference.

3. The computer-implemented method of claim 2, wherein each first frame of the video and each second frame of the video is divided into a plurality of data packets.

4. The computer-implemented method of claim 3, wherein each of the plurality of data packets is associated with a sequence number.

5. The computer-implemented method of claim 1, wherein the forecast minimizes a likelihood that data packets are stored at the second device for longer than a threshold amount of time.

6. The computer-implemented method of claim 1, wherein transmitting, by the first device, the predicted forecast to the second device comprises:
 transmitting, by the first device, the predicted forecast with data packets to the second device.

7. A device for communicating multimedia content; the device comprising:
 a computer-processor; and
 a non-transitory computer-readable storage medium storing executable code, the code when executed by the computer-processor cause the computer processor to perform steps comprising:
  receiving, by the device, a first plurality of data packets from another device via a cellular network, the first plurality of data packets representative of one or more first frames of multimedia content;
  modeling, by the device, a data transmission rate of the cellular network based on a continuous probability distribution, wherein the data transmission rate of the cellular network is assigned a conjugate prior;
  predicting, by the device, a forecast that is indicative of an amount of data that the other device can transmit to the device via the cellular network based on the modeled data transmission rate;
  transmitting, by the device, the predicted forecast to the other device via the cellular network; and
  receiving, by the device, a second plurality of data packets from the second device via the cellular network according to the forecast, the second plurality of data packets representative of one or more second frames of multimedia content.

8. The device of claim 7, wherein the multimedia content is video from a video conference.

9. The device of claim 8, wherein each first frame of the video and each second frame of the video is divided into a plurality of data packets.

10. The device of claim 9, wherein each of the plurality of data packets is associated with a sequence number.

11. The device of claim 7, wherein the forecast minimizes a likelihood that data packets are stored at the second device for longer than a threshold amount of time.

12. The device of claim 7, wherein transmitting, by the device, the predicted forecast to the second device comprises:
 transmitting, by the device, the predicted forecast with data packets to the second device.

13. A non-transitory computer-readable storage medium storing executable code for communicating multimedia content, the code when executed by a computer-processor cause the computer processor to perform steps comprising:
 receiving, by the device, a first plurality of data packets from another device via a cellular network, the first plurality of data packets representative of one or more first frames of multimedia content;
 modeling, by the device, a data transmission rate of the cellular network based on a continuous probability distribution, wherein the data transmission rate of the cellular network is assigned a conjugate prior;
 predicting, by the device, a forecast that is indicative of an amount of data that the other device can transmit to the device via the cellular network based on the modeled data transmission rate;
 transmitting, by the device, the predicted forecast to the other device via the cellular network; and
 receiving, by the device, a second plurality of data packets from the second device via the cellular network according to the forecast, the second plurality of data packets representative of one or more second frames of multimedia content.

14. The non-transitory computer-readable storage medium of claim 13, wherein the multimedia content is video from a video conference.

15. The non-transitory computer-readable storage medium of claim 14, wherein each first frame of the video and each second frame of the video is divided into a plurality of data packets.

16. The non-transitory computer-readable storage medium of claim 15, wherein each of the plurality of data packets is associated with a sequence number.

17. The non-transitory computer-readable storage medium of claim 13, wherein the forecast minimizes a likelihood that data packets are stored at the second device for longer than a threshold amount of time.

18. The non-transitory computer-readable storage medium of claim 13, wherein transmitting, by the device, the predicted forecast to the second device comprises:
 transmitting, by the device, the predicted forecast with data packets to the second device.

* * * * *